United States Patent
Matsubara

(10) Patent No.: US 9,218,275 B2
(45) Date of Patent: Dec. 22, 2015

(54) MEMORY MANAGEMENT CONTROL SYSTEM, MEMORY MANAGEMENT CONTROL METHOD, AND STORAGE MEDIUM STORING MEMORY MANAGEMENT CONTROL PROGRAM

(71) Applicant: NEC Corporation, Minato-ku, Tokyo (JP)

(72) Inventor: Keisuke Matsubara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 14/036,821

(22) Filed: Sep. 25, 2013

(65) Prior Publication Data

US 2014/0089611 A1    Mar. 27, 2014

(30) Foreign Application Priority Data

Sep. 25, 2012    (JP) ................. 2012-211439

(51) Int. Cl.
*G06F 3/00*    (2006.01)
*G06F 12/00*    (2006.01)
*G06F 12/02*    (2006.01)
*G06F 13/00*    (2006.01)
*G06F 12/08*    (2006.01)

(52) U.S. Cl.
CPC ............ *G06F 12/00* (2013.01); *G06F 12/0253* (2013.01); *G06F 12/08* (2013.01)

(58) Field of Classification Search
CPC .................................. G06F 3/00; G06F 13/00
USPC ............................................... 710/1; 711/100
See application file for complete search history.

(56) References Cited

U.S. PATENT DOCUMENTS

| | | | | |
|---|---|---|---|---|
| 6,098,089 | A * | 8/2000 | O'Connor et al. | 718/104 |
| 7,904,493 | B2 * | 3/2011 | Schmelter et al. | 707/820 |
| 8,904,090 | B2 * | 12/2014 | Baek et al. | 711/103 |
| 2010/0011357 | A1 * | 1/2010 | Ramamurthy | 718/1 |
| 2012/0159477 | A1 * | 6/2012 | Veresov | 718/1 |

FOREIGN PATENT DOCUMENTS

| | | |
|---|---|---|
| JP | 04-352254 A | 12/1992 |
| JP | 2007-157131 A | 6/2007 |
| JP | 2007-249491 A | 9/2007 |

* cited by examiner

*Primary Examiner* — Christopher Shin

(57) ABSTRACT

Disclosed is a memory management control system or the like, which can decrease degradation of processing performance.

The memory management control system 1 includes an instruction unit 2. In the case that reference data referred to by a job, and first data existing in an area collected by a storage apparatus are identical, the instruction unit 2 issues a first instruction to write the first data in the storage apparatus, and in the case of not being identical, the instruction unit 2 does not issue the first instruction.

8 Claims, 18 Drawing Sheets

Fig. 3

| EXECUTION DATE | TIME | JOB IDENTIFIER | PARAMETER | EXECUTION OBJECT | RESTRICTIVE CONDITION | PRIORITY |
|---|---|---|---|---|---|---|
| YYYY/MM/DD | 22:00:000 | job1 | A,B,C | JJ | EndOfTime | Normal |
| YYYY/MM/DD | 23:00:000 | job2 | D,E,F | KK | BestEffortofSpeed | Normal |

Fig. 4A

| JOB ID | JOB IDENTIFIER | EXECUTION OBJECT | STATE |
|---|---|---|---|
| 000001 | job1 | Node-1 | RUNNING |

Fig. 4B

| STEP ID | STEP IDENTIFIER | EXECUTION OBJECT | STATE | NAME OF DIVIDED STEP | NUMBER OF ENDED PROCESSES | JOB ID |
|---|---|---|---|---|---|---|
| 000001 | step1 | Node-1 | RUNNING | step1-1 | 1 | 000001 |
| 000002 | step1 | Node-2 | RUNNING | step1-2 | 2 | 000001 |
| 000003 | step1 | Node-n | RUNNING | step1-n | 1 | 000001 |

Fig. 7

| JOB ID | REFERENCE DATA |
|--------|----------------|
| 1 | A |
| 2 | B |
| 3 | C |

Fig. 8

| JOB ID | REFERENCE DATA | STEP ID | EXECUTION OBJECT | RESULT OF PROCESS | ⋮ |
|---|---|---|---|---|---|
| 1 | A | 10 | Node-1 | ok | ⋮ |
| 2 | B | 20 | Node-2 | ok | ⋮ |
| ⋮ | ⋮ | ⋮ | ⋮ | ⋮ | ⋮ |

Fig. 16

| DATA | ARRANGEMENT | | ACCESS | | |
|---|---|---|---|---|---|
| | MASTER | COPY | priority | count | time |
| X | ALL | — | High | 1000 | long |
| Y | 2 | 1 | Mid. | 100 | long |
| Z | DFS | — | Low | 1 | long |
| V | DFS | — | Low | 0 | long |
| ... | ... | ... | ... | ... | ... |

Fig. 17

| NODE | idx | MEMORY STORE | | | DISK | idx | DISK STORE | | | | | |
|---|---|---|---|---|---|---|---|---|---|---|---|---|
| 1 | X, Y, Z, V, W, | X | | | | Z, V, B, A, B, C, | | (V) | W | | B | (C) |
| 2 | | X | (Y) | | | | Z | V | (W) | A | | C |
| 3 | | X | | Y | | | (Z) | | | (A) | (B) | |

Fig. 18

| NAME OF STEP | EXECUTION OBJECT | PROCESS DATA SET | REFERENCE DATA SET |
|---|---|---|---|
| Step1-1 | Node-1 | A | X |
| Step1-2 | Node-2 | B | X,Y |
| Step1-3 | Node-3 | C | X,Y,Z |

MEMORY MANAGEMENT CONTROL SYSTEM, MEMORY MANAGEMENT CONTROL METHOD, AND STORAGE MEDIUM STORING MEMORY MANAGEMENT CONTROL PROGRAM

This application is based upon and claims the benefit of priority from Japanese Patent Application No. 2012-211439 filed on Sep. 25, 2012, the disclosure of which is incorporated herein in its entirety by reference.

TECHNICAL FIELD

The present invention relates to a memory management control system or the like.

BACKGROUND ART

A batch process is a process in which a desired process starts at predetermined timing, and afterward the desired process is repeated to predetermined data.

Distributed parallel process is a method for processing a large volume of data at a high speed by making a plurality of servers (referred to as a computer, a calculation processing apparatus, an information processing apparatus, a calculation processing system, an information processing system or the like hereinafter) cooperate with each other. For example, the consistent hashing is one example of realizing distributed parallel process efficiently.

The consistent hashing or a method using a distributed hash table is one of a method for distributing data to each of plural calculation processing nodes (information processing node which will be referred to as "node" hereinafter) that a computer includes. For example, according to the consistent hashing, by assigning a hash key, which is used when data is arranged in each node, to each node virtually, specific data is arranged in any node of a distributed parallel computer.

Meanwhile, a multi-tasking operating system (Operating System which will be referred to as "OS" hereinafter), which operates on a distributed parallel computer, has a function to convert an address between a virtual memory space and a physical memory space of a main memory apparatus mutually per a process, a function to control paging, a function to manage a memory (hereinafter, referred to as "memory managing function") or the like. The multi-tasking OS realizes the memory managing function by using a memory managing unit (Memory Managing Unit which will be referred to as "MMU" hereinafter) that an OS kernel and a processor provide.

The memory managing function manages an access to a main memory apparatus (hereinafter, abbreviated as "memory") from a process. By virtue of the memory managing function, a programmer can create a program without considering whether a destination of an access from the process to the memory is the physical memory space or the virtual memory space.

Meanwhile, Garbage Collection (hereinafter, referred to as "garbage collector" or "GC") is a mechanism or a kind of programming techniques to prevent memory leak. GC reduces a time and effort that a programmer frees a memory area explicitly, and reduces a load that a programmer carries out a system call on reserving and freeing a memory area.

GC detects an unnecessary memory area from the memory area that the process reserves. Then, GC collects the unnecessary memory area. Consequently, another process can use the memory area that GC collects. As a result, number of times of the process's carrying out the system call for reserving the memory area and the system call for freeing the memory area is reduced.

The mark and sweep model is one example of a model which realizes GC. The mark and sweep model includes a mark phase and a sweep phase.

In the mark phase, GC checks each object in the memory area whether the process or the like refers to the object. In the case that the process or the like refers to the object, GC marks each object. GC stores a marking result in a predetermined memory area.

In the sweep phase, GC frees a memory area that is assigned to each object not marked in the mark phase (that is, an object to which the process or the like does not refer).

Since each process is executed independently of each other, according to GC mentioned above, the memory area to which the process or the like does not refer is generated fragmentarily in the memory space. The memory managing function may include a function to defragment the memory area that is generated fragmentarily after the sweep phase in some cases.

In the case of a programming language such as Java (hereinafter, referred to as "Java (registered trademark)"), the dot net (hereinafter, referred to as ".Net") or the like, an environment for executing the memory managing function, such as Java_Virtual_Machine (hereinafter, referred to as "JVM"), .Net_Framework_Runtime or the like has a function to carry out GC. For example, a GC function in JVM monitors the heap memory. On the basis of the mark and sweep model mentioned above, GC collects the memory area, to which the process or the like does not refer, out of the heap memory that is assigned to JVM, Afterward, the memory managing function in JVM defragments the fragmented data.

In the description mentioned above, the process to collect the memory area is not always a process to return management of the memory area that is assigned to JVM to OS. For example, in a memory management model that uses the malloc function to assign a memory area, and the free function to free the assigned memory area, the management of the memory area that the process frees is not returned to OS. According to the memory management model, the process assigns a memory area according to the malloc function by using the memory area that is freed by the free function.

Next, a method to realize the batch process based on distributed parallel process will be described.

A batch executing base has information about a date and time when executing the batch processor the like beforehand. The batch executing base starts the batch process at a predetermined date and time according to the control information. As a method how the batch executing base executes the batch process, there is a method that a client instructs to execute the batch process in addition to the method mentioned above.

A process which is executed by a distributed batch executing base 30 will be described with reference to FIG. 15. FIG. 15 is a block diagram showing a system configuration of the distributed batch executing base 30 which is related to the present invention.

A distributed parallel system 32 includes the distributed batch executing base 30 and a distributed data store 31. The distributed batch executing base 30 has a function to process at least one job. The distributed batch executing base 30 processes a plurality of jobs in parallel or in pseudo-parallel. It is also possible that the distributed batch executing base 30 is realized by a plurality of computers which are connected to each other through a communication network (hereinafter, abbreviated as "network").

A batch execution managing mechanism unit 34 of each node has a function by which the own node processes the job (hereinafter, referred to as "batch executing function"). In the distributed parallel system 32, the batch execution managing mechanism unit 34 of each node shares information on a configuration and information on computer resources. The batch execution managing mechanism unit 34 controls a whole of the function to process the batch by each node's communicating the configuration information or the like, with each other.

By communicating with the batch execution managing mechanism unit 34 of the distributed batch executing base 30, a job control unit 35 controls the job between a starting time and an end time of executing the job. The job control unit 35 controls the job with reference to a job repository 38. The job repository 38 can associate information on control of executing the job, information on a history of executing the job and information on a state of executing the job, and store the associated information.

A batch application includes a definition on at least one job, and a batch program which is executed in the job. The definition on the job includes a definition on content of the batch process and a definition on data that is a process object. Moreover, the batch program includes a method for arranging data that is the process object in the distributed parallel system 32. The method for arranging the data defines arrangement of the data which reduces an overhead caused when the data is exchanged in the distributed data store 31. The job definition may not always include the batch program and the information on the method for arranging the data.

For example, the definition on the job includes a definition on a step (Step) that indicates a part of processes of the job, an order of executing the step, data that is the process object of the job, a path name that indicates a storage area of the data, information on a format of the data, information on properties of the data and the like.

The definition on the job may include a pre-process, a post-process and the like of each step. The definition on the step mentioned above may include information on a policy (processing method) on the distributed batch executing function, and a policy (processing method) on a synchronous process that is executed after the distributed parallel process. The definition on the job may not always include all the items mentioned above.

The batch execution managing mechanism unit 34 arranges the batch application to a plurality of the distribution batch executing base 30 through a management interface 36. An application managing unit 33 manages the batch application, which the batch execution managing mechanism unit 34 arranges, by using an application repository 37. The application repository 37 has the batch application and management information on the batch application (that is, records on a person who arranges the application, a time when arranging the application, the batch application which is selected, a classification of setting for arranging the application which are associated with each other and stored). A plurality of the batch applications may exist in the application repository 37.

Furthermore, the application managing unit 33 may include a function to analyze the batch application and a function to check validity.

The job is a batch processing program that can execute the batch application in the distributed batch executing base 30. The job may include a plurality of processes in one step.

Next, a method for realizing the distributed data store will be described.

The step in the job defines a reading process, a writing process, an updating process, deleting process and the like that are executed to data of the distributed data store 31 through an input/output interface of the distributed data store 31.

The distributed data store 31 includes at least one data store in a plurality of computers which are connected to each other through the network. The data of the distributed data store 31 is associated with metadata. For example, the metadata includes information on a key which is necessary to access data, information on a storage location at which data is stored, access information which indicates a situation of using data and the like. At least one node which the distributed data store 31 includes shares the metadata. As a result, a client can access data that a local node or a remote node has through the input/output interface without the consideration about the node which stores the data.

A data managing unit 39 manages the metadata associated with the data which the distributed data store 31 of the local node stores. A process in which the data managing unit 39 manages the metadata will be described in the following with reference to FIG. 16. FIG. 16 is a conceptual diagram showing an example of the metadata that the data managing unit 39 manages related to the present invention. The metadata associates data which the metadata indicates, information on the arrangement of the data, and the access information which is referred to when the data is accessed.

The information on the arrangement of the data includes information on a master node which has original data, and a copy node which has a copy of the original data. For example, the access information includes information on "priority" which indicates a degree of priority, "count" which indicates number of times of Referring to the data, and "time" which indicates a length of a time for processing the data. For example, in FIG. 16, a node "2" has data which "Y" indicates, and a node "1" has a copy of the data. The priority of the data is "Mid." (that is, middle), and the data is referred to one hundred times, and the time for processing the data is "long" (that is, long).

The data managing unit 39 cooperates (interlocking) with a data managing unit 39 of another node (or, referred to as "remote node") in the distributed parallel system. For this reason, a client can access the data through the input/output interface of the distributed data store without consideration of the node in which the data exists. For example, Java_Virtual_Machine (hereinafter, referred to as "JVM") has a function related to the data managing unit 39 mentioned above.

The distributed data store 31 will be described. The distributed data store 31 stores data which is processed in the batch process. For example, the distributed data store 31 includes computer resources, file systems, a database, and a data managing software of the on-memory type data store or the like of the own node, and computer resources of another nodes such as a hard disk and a memory (referred to as "main storage apparatus" or "main memory" hereinafter). A client can process the data without depending on a storage location at which the data is stored. Hereinafter, it is assumed that the distributed data store 31 includes also a data store which is realized in one calculation processing system.

An on-memory type data store is a data store whose storage location of data is a memory or the like. Moreover, a disk type data store is a data store whose storage location of data is a hard disk or the like. A processing speed for data in the on-memory type data store is higher than one for data in the disk type data store.

Furthermore, in the distributed data store 31, the data stores of plural computers cooperate to each other through the network. Therefore, a client can handle the distributed data store 31 as a single data store.

A system which a patent document 1 discloses estimates a time that is consumed for executing a job based on job characteristics and number of inputting data, and estimates a load of each server which is caused within a range of the estimated time. The system selects a server that executes the job based on a state of the estimated load. By making the load of each server equal, the system reduces the time required for processing the job.

According to a GC method which is disclosed in a patent document 2, an unnecessary memory area in a loop is collected according to a state of data which a pointer designates.

In GC, a device that a patent document 3 discloses creates a profile which indicates a state of using a memory area, and estimates a possibility that a memory area becomes short based on the profile.

PRECEDING TECHNICAL DOCUMENT

Patent document

[Patent document 1] Japanese Patent Application Laid-Open No. 2007-249491
[Patent document 2] Japanese Patent Application Laid-Open No. 1992(H04)-352254
[Patent document 3] Japanese Patent Application Laid-Open No. 2007-157131

BRIEF SUMMARY OF THE INVENTION

Problem to be Solved by the Invention

In the case that GC decides that a specific process intends to refer to a memory area but does not refer to the memory area actually, GC collects the memory area by storing data that exists in the memory area in the disk. Therefore, in the case that the process refers to the data which exists in the memory area, the memory managing function reads the data again from the disk and writes the data in the memory area. That is, contention between the process and GC occurs, and consequently processing performance of the system becomes degraded.

An example of performance degradation due to the contention that occurs between the process and GC will be described in the following with reference to FIG. 17 and FIG. 18. FIG. 17 is a conceptual diagram showing an example of data which is stored in the distributed data store related to the present invention. FIG. 18 is a conceptual diagram showing an example of a definition on a job related to the present invention.

The distributed data store has data (hereinafter, referred to as "process data") which is processed. In FIG. 17, the process data is A, B, C, V, W, X, Y and Z. Each node stores the process data through an input/output interface.

Moreover, it is also possible that the distributed system makes the data stored in a plurality of nodes redundantly. In this case, even in the case that a failure occurs in an own node, the distributed system reads the redundant data which exists in another node, and consequently restores the data in the own node. In this example, the distributed system stores one copy data per one original data.

FIG. 17 shows that data (A) is copy data of process data A. That is, a disk type data store in Node-3 stores the copy data of the process data A, and copy data of process data B. In the following description, original data (for example, data set A) may be denoted as master data, and data which is a copy of the original data (for example, data set (A)) may be denoted as copy data in some cases.

It is assumed that data sets A, B and C are object data of the batch process, and any data set is independent of each other.

For example, the data sets A, B and C are transaction data of goods in a store area A, a store area B and a store area C respectively. In the following description, it is assumed that the data sets A, B and C depend on data sets X, Y and Z. For example, it is assumed that the data set A depends on the data set X, and the data set B depends on the data sets X and Y, and the data set C depends on the data sets X, Y and Z.

It is assumed that data sizes of the data sets A, B and C are sufficiently larger than a total of memory sizes which can be secured by on-memory type data stores of Node-1 to Node-3 in FIG. 17. On the other hand, it is assumed that the data sizes of the data sets A, B and C are sufficiently smaller than a total of disk capacities which can be secured by disk type data stores.

It is assumed that any one of the data sets X, Y and Z has no dependency on the other dataset out of the data sets X, Y and Z. For example, the data sets X, Y and Z are data sets on the master data of the goods respectively.

Furthermore, it is assumed that a total of data sizes of the data sets X, Y, Z, V and W is larger than a total of the memory sizes which can be reserved by the on-memory type data stores of Node-1 to Node-3, and a part of all data can not be arranged in the on-memory type data stores. Furthermore, according to the exemplary embodiment, it is assumed that a total of the data sizes of the data sets X and Y corresponds to an upper limit size of the on-memory type data store of each node.

Referring to FIG. 17, the on-memory type data store (on-memory type data store is data which is described in a column of "memory" in FIG. 17) includes the data sets X and Y. Moreover, the disk type data store (disk type data store is data which is described in a column of "disk" in FIG. 17) includes the data sets Z, V and W.

Job control divides a process of step 1 (step 1 is equivalent to a combination of step 1-1, step 1-2 and step 1-3 which are shown in FIG. 18) which is included in a job 1, and assigns the divided processes to Node-1, Node-2 and Node-3 respectively based on a job definition of the job 1 shown in FIG. 18. By Referring to information on arrangement of the data which the distributed data store has, the job control assigns a node, which has data corresponding to the process object, a process of the data corresponding to the process object as far as possible.

Referring to FIG. 17, for example, master data of the process data set (hereinafter, referred to as "data set") A exists in Node-2. As a result, Node-2 starts a process of step 1-2. Since Node-1 has master data of the data set B, Node-1 processes step 1-1. Node-2 has master data of the data set C, and Node-1 has copy data of the data set C. However, Node-1 processes step 1-1, and Node-2 processes step 1-2. In order to realize the load distribution, Node-3 processes remaining step 1-3.

However, since Node-3 does not have the data set C in the distributed data store, Node-3 copies the data set C from Node-2, which has the master data, through the network.

In step 1-2, Node-2 reads the data set A from the disk type data store. Next, since the data set A depends on the data set X, Node-2 combines the read data set A, and the data set X which is stored in the on-memory type data store of Node-2, and processes the combined data.

In step 1-1, Node-1 reads the data set B from the disk type data store of Node-1. Next, since the data set B depends on the data sets X and Y, Node-1 combines the read data set A, and the data sets X and Y that are stored in the on-memory type data store of Node-1, and processes the combined data in step 1-1. However, since the on-memory type data store of Node-1 does not have the data set Y, Node-1 refers to the data set Y that Node-3 has through the network.

In step 1-3, Node-3 reads the data set C from the disk type data store of Node-3. Next, since the data set C depends on the data sets X, Y and Z, Node-3 combines the read data set A, and the data sets X, Y and Z that which are stored in the on-memory type data store of Node-3, and processes the combined data in step 1-3. However, the on-memory type data store of Node-3 does not have the data set Z.

Therefore, whenever an access to data included in the data set Z is generated, Node-3 reads the data from the disk type data store of Node-3 in step 1-3. Therefore, processing performance of Node-3 is degraded in step 1-3. As a result, performance of processing the job 1 is also degraded.

Moreover, Node-3 can not store a part of the data set Z in the on-memory type data store. Furthermore, Node-3 has the data sets X and Y in the on-memory type data store. Therefore, the on-memory type data store of Node-3 does not have a memory area which stores the data set Z. As a result, Node-3 stores the data set Z in the on-memory type data store of Node-1 having a memory area which can store the data set Z.

A data managing unit purges and stores data that has the oldest reference time among the data of the data set Y or Z in the disk type data store. However, a node which processes the data may read data that the data managing unit purges in some cases. The process needs an additional input/output to/from the disk respectively. Therefore, processing performance in step 1-3 and the job 1 decreases.

In the description mentioned above, each node is associated with one hash key as a method to realize the distributed data store. However, a plurality of nodes may share one hash key in some cases by the distributed Hash Table based on the consistent hashing.

Accordingly, a main object of the present invention is to provide a memory managing system or the like which decreases degradation of process performance.

SUMMARY

In order to achieve the above-mentioned object, a memory management control system according to the present invention is characterized by including the following configuration.

That is, the memory management control system according to the present invention is characterized by including:

an instruction unit that makes a execution decision whether to issue a first instruction that is the instruction for writing a first data existing in an collected area in a storage apparatus into the storage apparatus in case that reference data that a job refers to and the first data are identical or to not issue the first instruction in case of not being identical.

As another aspect of the present invention, a memory management control method according to the present invention is characterized in that:

carries out execution decision whether to issue a first instruction that is the instruction for writing a first data existing in an collected area in a storage apparatus into the storage apparatus in case that reference data that a job refers to and the first data are identical or to not issue the first instruction in case of not being identical.

Furthermore, the object is also realized by a non-transitory computer-readable storage medium including a memory management control program.

BRIEF DESCRIPTION OF THE DRAWINGS

Exemplary features and advantages of the present invention will become apparent from the following detailed description when taken with the accompanying drawings in which:

FIG. 3 is a conceptual diagram showing an example of source data which specifies reference data in the first exemplary embodiment;

FIG. 4A is a conceptual diagram showing an example of source data which specifies reference data in the first exemplary embodiment;

FIG. 4B is a conceptual diagram showing an example of source data which specifies the reference data in the first exemplary embodiment;

FIG. 7 is a conceptual diagram showing an example of data in a storage unit according to the second exemplary embodiment;

FIG. 8 is a conceptual diagram showing an example of a job execution history in the storage unit according to the second exemplary embodiment;

FIG. 16 is a conceptual diagram showing an example of metadata which is managed by a data managing unit related to the present invention;

FIG. 17 is a conceptual diagram showing an example of data which is stored in a distributed data store related to the present invention; and FIG. 18 is a conceptual diagram showing an example of a definition on a job related to the present invention.

EXEMPLARY EMBODIMENT

Next, exemplary embodiments for carrying out the invention will be described in detail with reference to a drawing.

<First Exemplary Embodiment>

Figure 1:
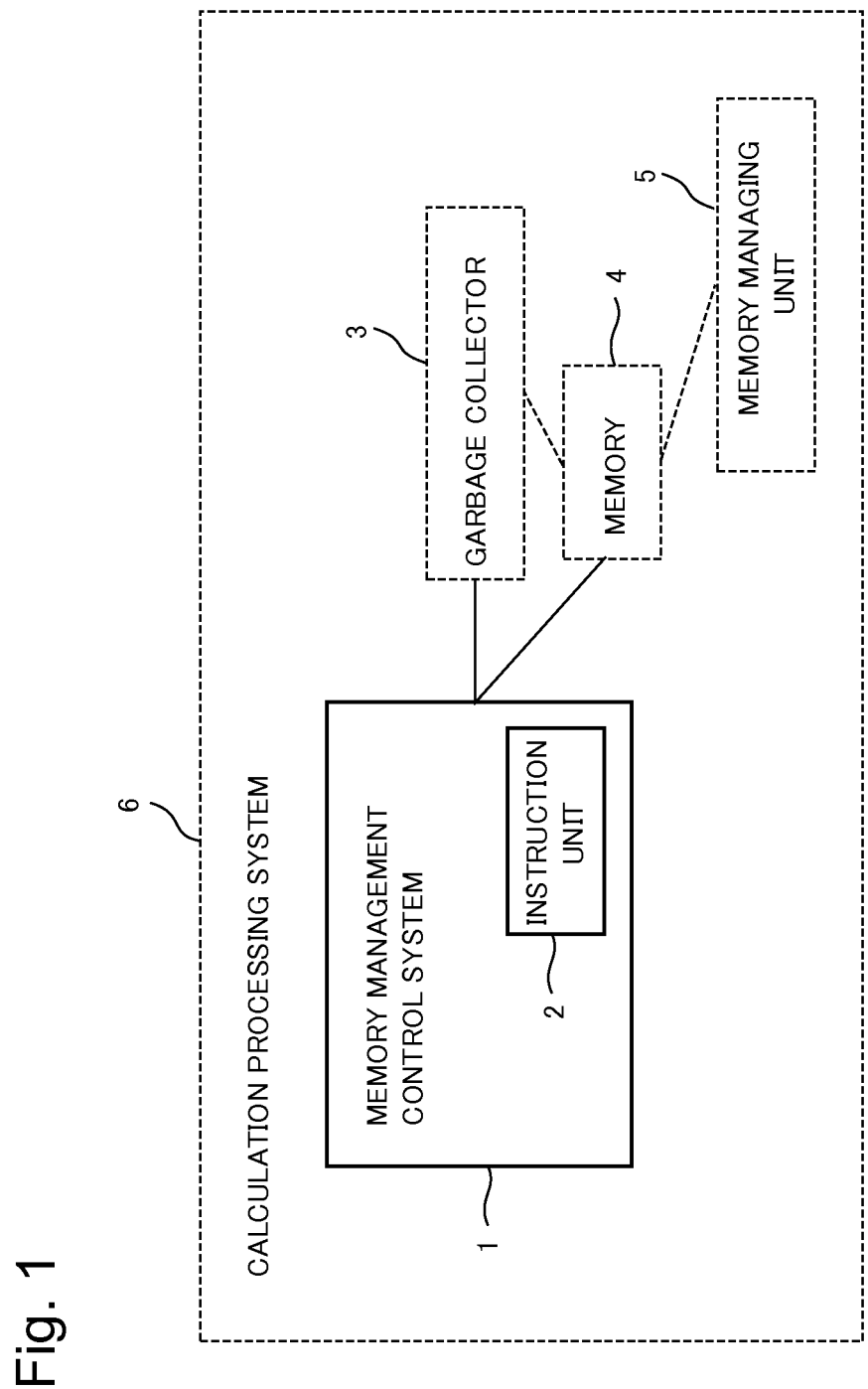
FIG. 1 is a block diagram showing a configuration of a memory management control system according to a first exemplary embodiment of the present invention.
Figure 2:
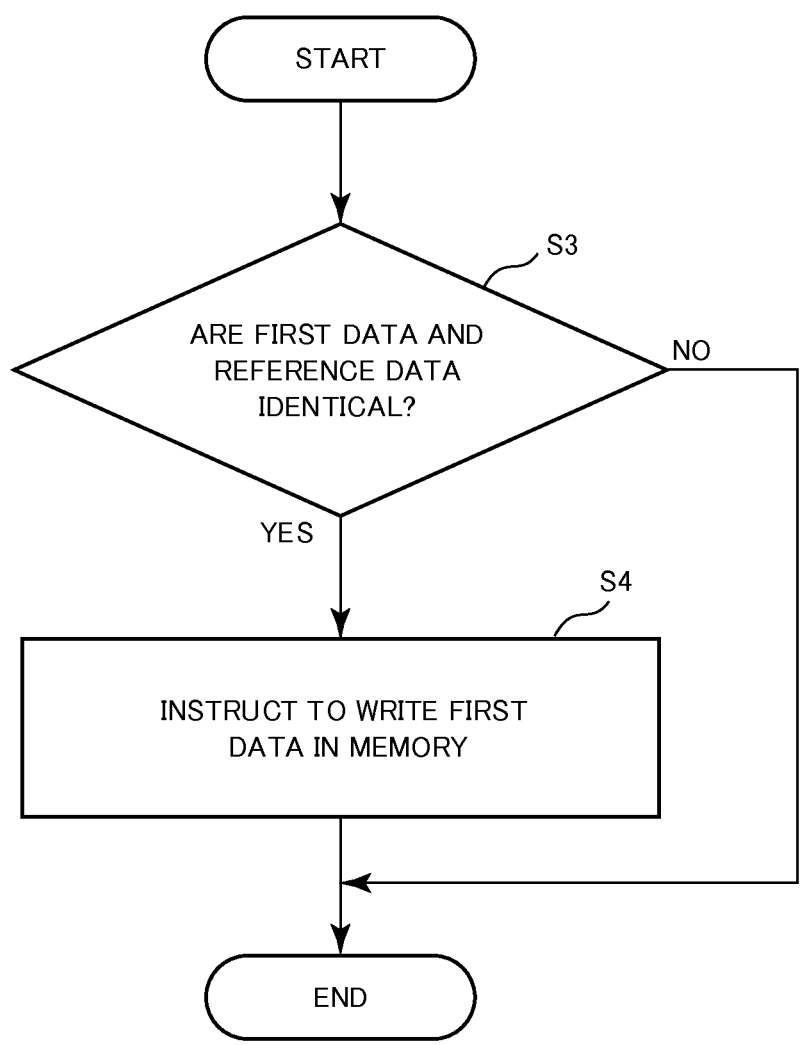
FIG. 2 is a flowchart showing a flow of processes in the memory management control system according to the first exemplary embodiment.

A configuration of a control system (hereinafter, referred to also as "memory management control system") according to a first exemplary embodiment of the present invention, and a process executed by a memory management control system 1 will be described in detail with reference to FIG. 1 and FIG. 2. FIG. 1 is a block diagram showing the configuration of the memory management control system 1 according to the first exemplary embodiment of the present invention. FIG. 2 is a flowchart showing a flow of the processes in the memory management control system 1 according to the first exemplary embodiment.

Referring to FIG. 1, the memory management control system 1 according to the first exemplary embodiment includes an instruction unit 2 issuing an instruction to write data that is corresponding to a process object in a memory. A calculation processing system (information processing system) 6 includes the memory management control system 1, a garbage collector 3 and a memory 4 (storage apparatus, main memory or on-memory type data store).

As described in the background art, the garbage collector 3 determines a memory area that is assigned to an object to which a process does not refer in the memory 4 based on a processing method such as the mark and sweep model or the like. Next, the memory managing unit 5 collects (purge, garbage collect, garbage collection and GC) the memory area that the garbage collector 3 has determined.

The instruction unit 2 compares data referred to by a job which the calculation processing system 6 is processing and/or a job which the calculation processing system 6 will process in the future (hereinafter, these data are collectively referred to as "reference data"), and first data existing in the memory 4 which the garbage collector 3 determines to purge (Step S3). In the case when the instruction unit 2 decides that the first data and the reference data are identical (YES in Step S3), the instruction unit 2 instructs to fetch the first data and to write the first data in the memory 4 (Step S4). When the instruction unit 3 decides that the first data and the reference data are not identical (NO in Step S3), the instruction unit 2 does not instruct to fetch the first data and to write the first data in the memory 4 (Step S4).

In the description mentioned above, a function to specify the job which is being processed or the job which will be processed in the future can be realized by referring to a job schedule as shown in FIG. 3 and a job running state as shown in FIG. 4A and FIG. 4B, or the like.

The job schedule which is one example of data to specify the reference data in the first exemplary embodiment will be described with reference to FIG. 3. FIG. 3 is a conceptual diagram showing an example of source data which specifies the reference data in the first exemplary embodiment. The job schedule is information on a predetermined schedule for executing a job (hereinafter, referred to as "predetermined schedule information"). The predetermined schedule information associates a date and time ("execution date" and "time" in FIG. 3) when a job is executed, a job identifier (hereinafter, referred to as "ID"), a parameter which is necessary to process the job, a restrictive condition on the job, an object for which the job is processed, and a priority of the job to be processed.

The distributed batch executing function, which is described in the background art, executes a job which has a certain job identifier in the case that the various conditions such as the date and time, the execution object, the restrictive condition, the priority and the like, which are associated with the job identifier, in the job schedule are satisfied. For example, in FIG. 3, the distributed batch executing function executes a job, whose job ID is "job 1" and whose priority is Normal, at a time of 22:00:00, YYYY/MM/DD under the condition of Endoftime at a location of the execution object of JJ with using parameters of A, B, and C.

The job schedule does not always need to include all values mentioned above, and moreover may include the other values. For example, the instruction unit 2 reads a part of reference data by reading the job that will be executed in the future, and the parameter that is associated with the job. A method for the instruction unit 2's obtaining the reference data is not limited to the method mentioned above.

For example, the instruction unit 2 can decide a state of the job by reading a job running state table shown in FIG. 4A and FIG. 4B. The job running state table that is an example of source data to specify the reference data in the first exemplary embodiment will be described with reference to FIG. 4A and FIG. 4B. Each of FIG. 4A and FIG. 4B is a conceptual diagram showing an example of the source data that specifies the reference data in the first exemplary embodiment.

The job running state table indicates two states. That is, one is a state of each job and the other is a state of each step in each job. Referring to FIG. 4A, the job running state table associates the job identifier, the object that executes the job, and the state of the job. Referring to FIG. 4B, the state of each step in each job associates the job identifier, a step ID, the object that executes the job, the state of the job, the object that executes the job and number of ended processes. For example, the instruction unit 2 decides the state of the job by reading the state of the job associated with the job identifier. The job running state table does not always need to include all values mentioned above, and moreover may include the other values.

While the instruction unit 2 executes the process by referring to the memory area that the garbage collector 3 collects according to the description mentioned above, the garbage collector 3 may include a notification unit (not shown in FIG. 1) that notifies execution of GC. For example, the notification unit may notify the execution of GC in the mark phase of the garbage collection. In this case, it is possible to realize the above mentioned function by executing the following. That is, when the instruction unit 2 decides NO in Step S3, the instruction unit 2 issues an instruction to execute GC, and when the instruction unit 2 decides YES in Step S3, GC is not executed. By virtue of the notification unit, it is possible to omit a process of reading data from the disk and writing the data in the memory 4.

While the operation of the memory management control system 1 according to the first exemplary embodiment has been described with exemplifying the calculation processing system 6 having the garbage collector 3 according to the description mentioned above, for example, the memory management control system 1 may be applied to the on-memory type data store. In this case, the instruction unit 2 compares data referred to by a job that the distributed batch executing base is processing and/or a job which the distributed batch executing base will process in the future, and first data in a memory area, which is purged and inputted into the disk type data store, in the on-memory type data store (corresponding to Step S3).

In the case that the instruction unit 2 decides that the first data and the reference data are identical (corresponding to deciding YES in Step S3), the instruction unit 2 instructs to fetch the first data and to write the first data in the on-memory type data store (corresponding to Step S4). In the case that the instruction unit 2 decides that the first data and the reference data are not identical (corresponding to deciding NO in Step S3), the instruction unit 2 does not instruct to fetch the first data and to write the first data in the on-memory type data store.

The system which the patent document 2 or the patent document 3 discloses collects a memory area that a job which is being executed does not refer to regardless of reference data of the job. Therefore, in the case that a memory area that will be referred to by the job in a post-process, is not referred to at the present time, the system collects the memory area. In this case, in order to process the job, the system reads data again from the storage medium such as a disk that has a low processing speed and writes the data again into the memory 4. As a result, according to the system that is disclosed in the patent document 2 or the patent document 3, performance of processing the job is degraded.

On the other hand, the memory management control system 1 according to the first exemplary embodiment fetches the data that is required to process the job and writes the data in the memory 4 in advance by referring the reference data of the job. As a result, according to the memory management control system 1 of the first exemplary embodiment, it is possible to decrease degradation of job processing performance due to writing data in the memory 4.

That is, according to the memory management control system of the first exemplary embodiment, it is possible to decrease the degradation of the processing performance.

<Second Exemplary Embodiment>

Next, a second exemplary embodiment of the present invention based on the first exemplary embodiment mentioned above will be described.

The following description focuses on a characteristic part according to the exemplary embodiment and omits an overlapped description by assigning a configuration according to the exemplary embodiment, which is the same as the configuration according to the first exemplary embodiment, a reference number that is the same as the reference number of the same configuration according to the first exemplary embodiment.

Figure 5:
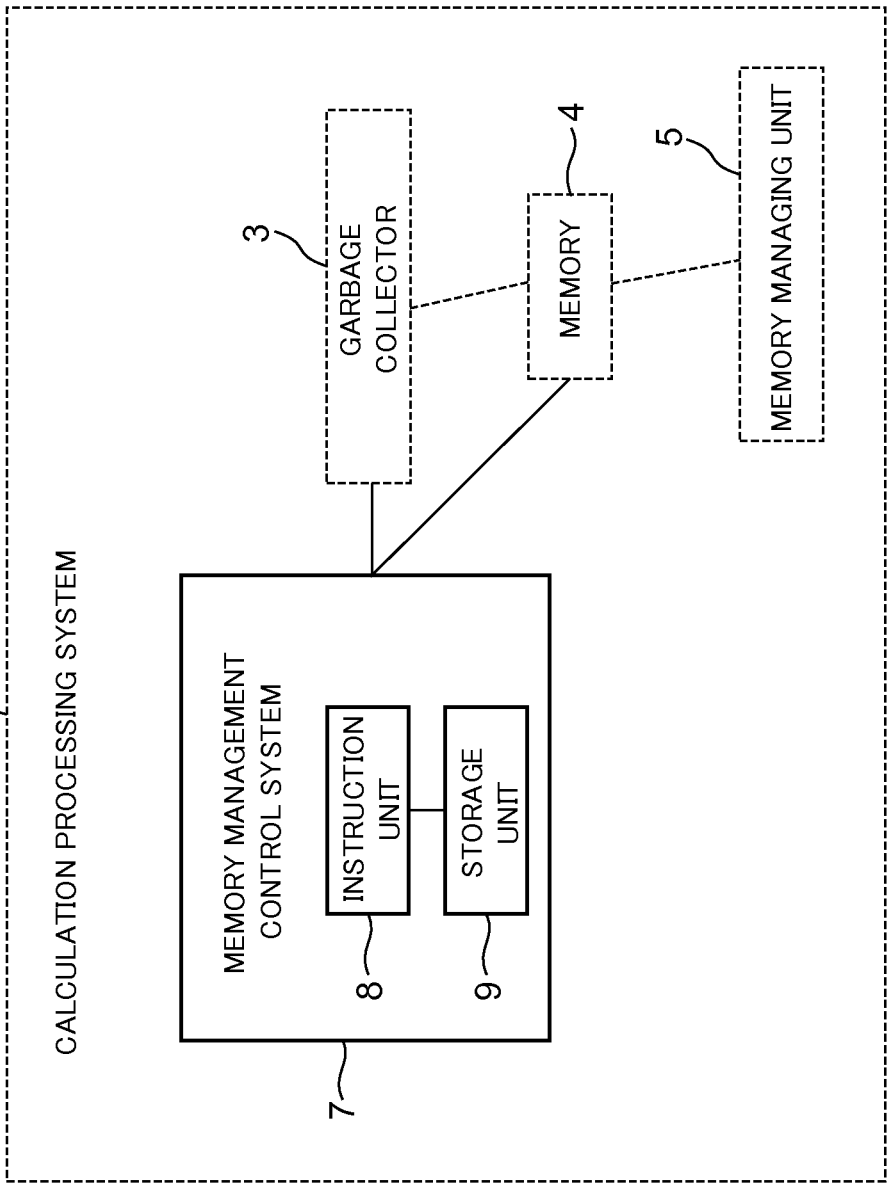
FIG. 5 is a block diagram showing a configuration of a memory management control system according to a second exemplary embodiment of the present invention.
Figure 6:
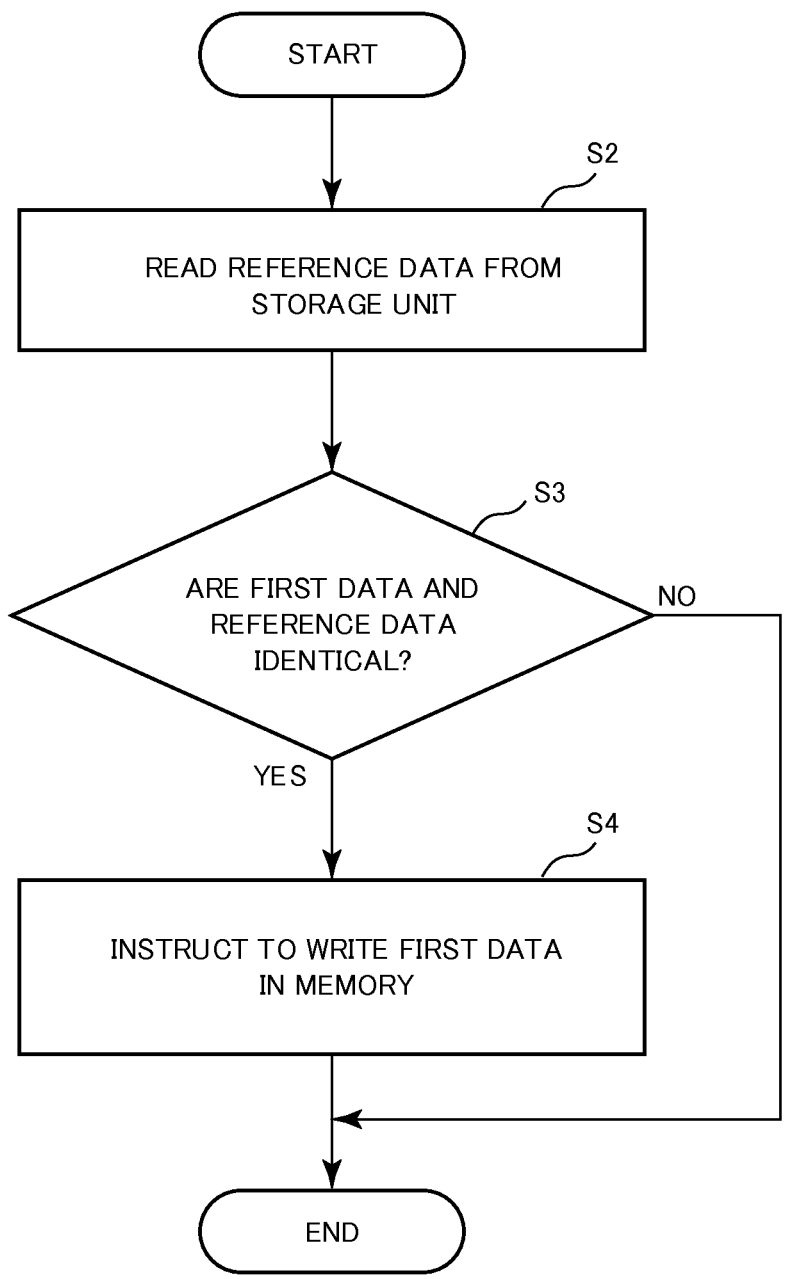
FIG. 6 is a flowchart showing a flow of processes in the memory management control system according to the second exemplary embodiment.

A configuration that a memory management control system 7 according to the second exemplary embodiment has, and a process that the memory management control system 7 executes will be described in the following with reference to FIG. 5 and FIG. 6. FIG. 5 is a block diagram showing the configuration of the memory management control system 7 according to the second exemplary embodiment of the present invention. FIG. 6 is a flowchart showing a flow of the processes in the memory management control system 7 according to the second exemplary embodiment.

Figure 7:
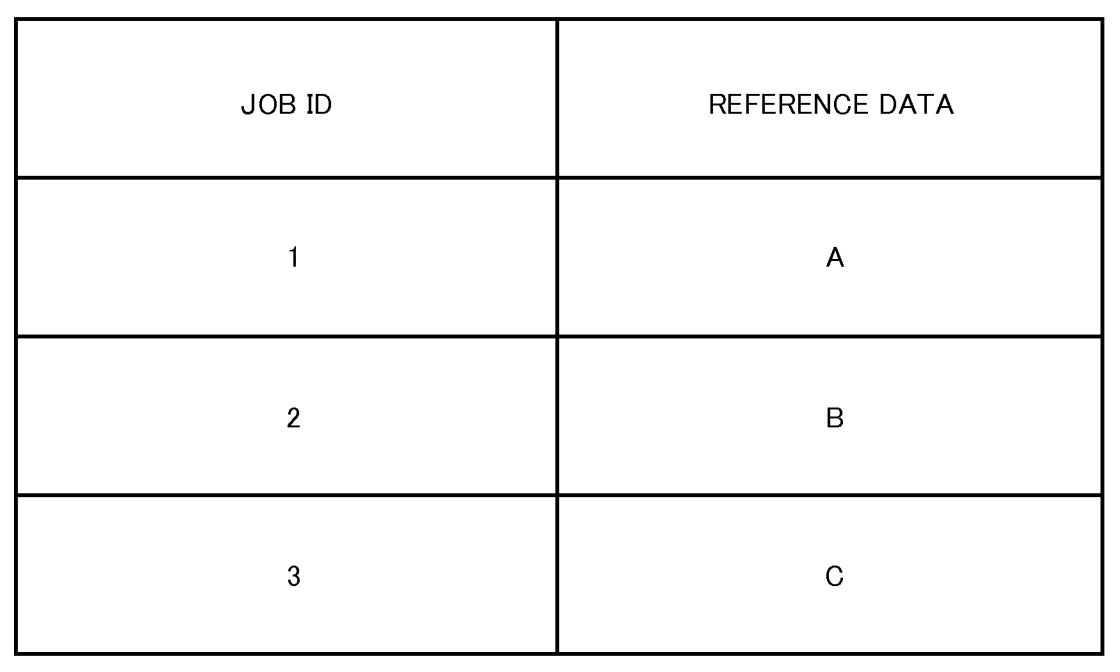

Referring to FIG. 5, the memory management control system 7 includes an instruction unit 8 and a storage unit 9. A calculation processing system 10 includes the memory management control system 7. The storage unit 9 can associate a job, and reference data that the job refers to, and stores the associated job and reference data. An example of data that the storage unit 9 can associate and store will be described in the following with reference to FIG. 7. FIG. 7 is a conceptual diagram showing the example of the data in the storage unit 9 according to the second exemplary embodiment. Referring to FIG. 7, the storage unit 9 associates a job identifier (hereinafter, referred to as "job ID") which identifies the job uniquely, and the reference data that is associated with the job ID, and stores the associated job ID and reference data. For example, in FIG. 7, since a job whose job ID is "1" is associated with reference data A, the job refers to the reference data A.

In the following description, the job is a job that a calculation processing system is processing and/or a job that the calculation processing system intends to process. The instruction unit 8 reads specific reference data that is associated with the job from the storage unit 9 (Step S2). Next, the instruction unit 8 executes the processes of Step S3 and Step S4 that are described in the first exemplary embodiment.

While it is assumed in the above-mentioned description that the instruction unit 8 reads the data as shown in FIG. 7 from the storage unit 9, for example, the instruction unit 8 can also read the data from history data (hereinafter, referred to as "job execution history") which indicates a history of executing the job as shown in FIG. 8.

The job execution history will be described in the following with reference to FIG. 8. FIG. 8 is a conceptual diagram showing an example of the job execution history in the storage unit according to the second exemplary embodiment. The job execution history associates the job identifier, a step ID, a parameter that is necessary to execute the job, an object that processes the job, a result obtained by processing the job, and the like. The job execution history may associate the other items such as a date and time when the job starts, a date and time when the job is ended or the like.

For example, a second row of FIG. 8 indicates that a node denoted as Node-1 processes step 1-1 of the job whose job ID is "1" with referring to A and a result of the process is OK (that is, process has been normally completed). That is, according to the example shown in FIG. 8, the job whose job ID is "1" is associated with the data which is denoted as A.

Since the configuration according to the second exemplary embodiment is the same as one according to the first exemplary embodiment, the second exemplary embodiment can have the same effect as the first exemplary embodiment has. Moreover, according to the second exemplary embodiment, it is possible to decrease number of referring to an external data by reading the specific reference data that is associated with the job from the storage unit 9.

That is, according to the memory management control system of the second exemplary embodiment, it is possible to decrease degradation of processing performance.

<Third Exemplary Embodiment>

Next, a third exemplary embodiment of the present invention based on the second exemplary embodiment mentioned above will be described.

The following description focuses on a characteristic part according to the exemplary embodiment and omits an overlapped description by assigning a configuration according to the second exemplary embodiment, which is the same as the configuration according to the second exemplary embodiment, a reference number that is the same as the reference number of the same configuration according to the second exemplary embodiment.

Figure 9:
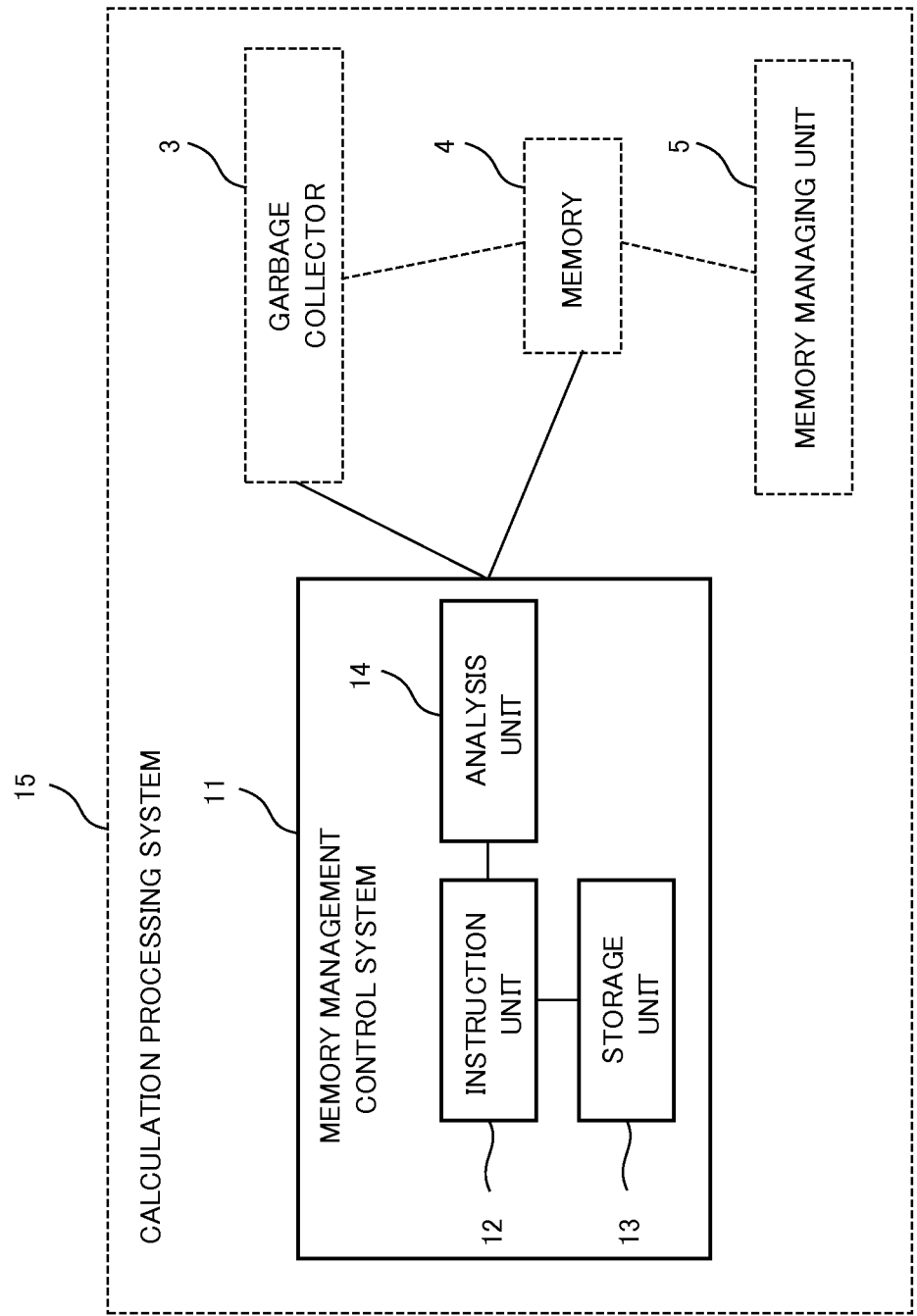
FIG. 9 is a block diagram showing a configuration of a memory management control system according to a third exemplary embodiment of the present invention.
Figure 10:
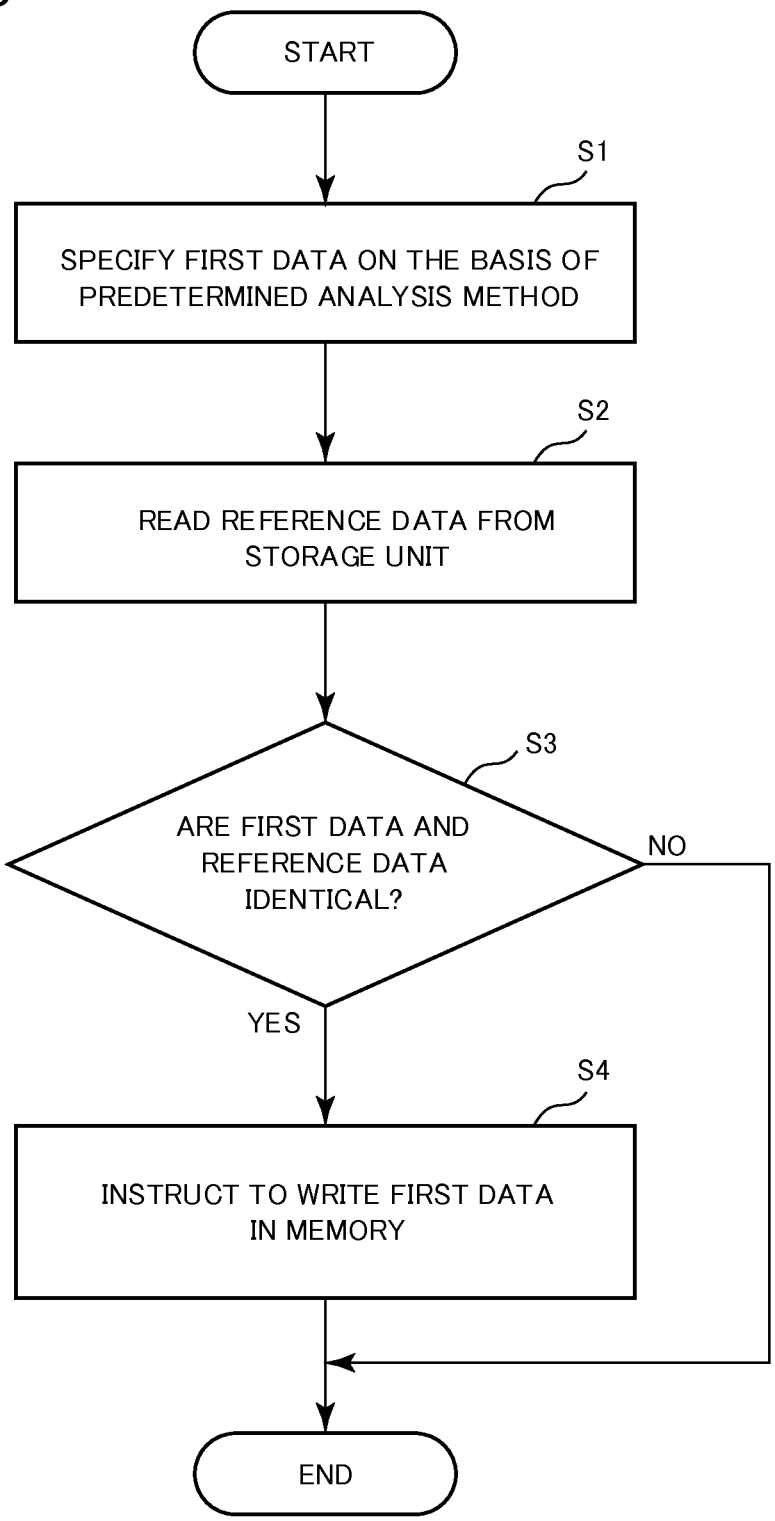
FIG. 10 is a flowchart showing a flow of processes in the memory management control system according to the third exemplary embodiment.

A configuration that a memory management control system 11 according to the third exemplary embodiment has, and a process that the memory management control system 11 executes will be described in the following with reference to FIG. 9 and FIG. 10. FIG. 9 is a block diagram showing the configuration of the memory management control system 11 according to the third exemplary embodiment of the present invention. FIG. 10 is a flowchart showing a flow of the processes in the memory management control system 11 according to the third exemplary embodiment.

Referring to FIG. 9, the memory management control system 11 includes an instruction unit 12, a storage unit 13 and an analysis unit 14. A calculation processing system 15 includes the memory management control system 11, the garbage collector 3, the memory 4 and the memory managing unit 5. The analysis unit 14 specifies first data by analyzing data that is stored in a collected memory area (partial area in the memory 4) based on a predetermined analysis procedure.

The analysis unit 14 specifies the first data by analyzing the data that is stored in the collected memory area based on the predetermined analysis procedure (Step S1). Next, the instruction unit 12 reads specific reference data that is associated with a job from the storage unit 13 (Step S2). Or, the analysis unit 14 may execute the process of Step S1 after the instruction unit 12 completes the process of Step S2. Moreover, these processes may be executed in parallel or pseudo-parallel. Next, the instruction unit 12 compares data referred to by a job that the calculation processing system 15 is processing and/or a job that the calculation processing system 15 will process in the future (hereinafter, these data are collectively referred to as "reference data"), and first data existing in an memory area ("collected memory area" mentioned above) that the garbage collector 3 determines to purge (Step S3).

As the predetermined analysis procedure, a method that, if stored data is the Java object, the analysis unit 14 extracts the Java object by analyzing byte arrangement is exemplified. In this case, by analyzing the extracted Java object, the analysis unit 14 decides that the data is metadata. The analysis unit 14 regards the object of the metadata as the first data.

Since the configuration according to the third exemplary embodiment is the same as one according to the second exemplary embodiment, the third exemplary embodiment can have the same effect as the second exemplary embodiment has. According to the third exemplary embodiment, since the analysis unit 14 analyzes the data that is stored in the collected memory area based on the predetermined analysis procedure, it is possible to execute the process more effectively.

That is, according to the memory management control system of the third exemplary embodiment, it is possible to decrease degradation of processing performance.

<Fourth Exemplary Embodiment>

Next, a fourth exemplary embodiment of the present invention based on the second exemplary embodiment mentioned above will be described.

The following description focuses on a characteristic part according to the exemplary embodiment and omits an overlapped description by assigning a configuration according to the fourth exemplary embodiment, which is the same as the configuration according to the second exemplary embodiment, a reference number that is the same as the reference number of the same configuration according to the second exemplary embodiment.

Figure 11:
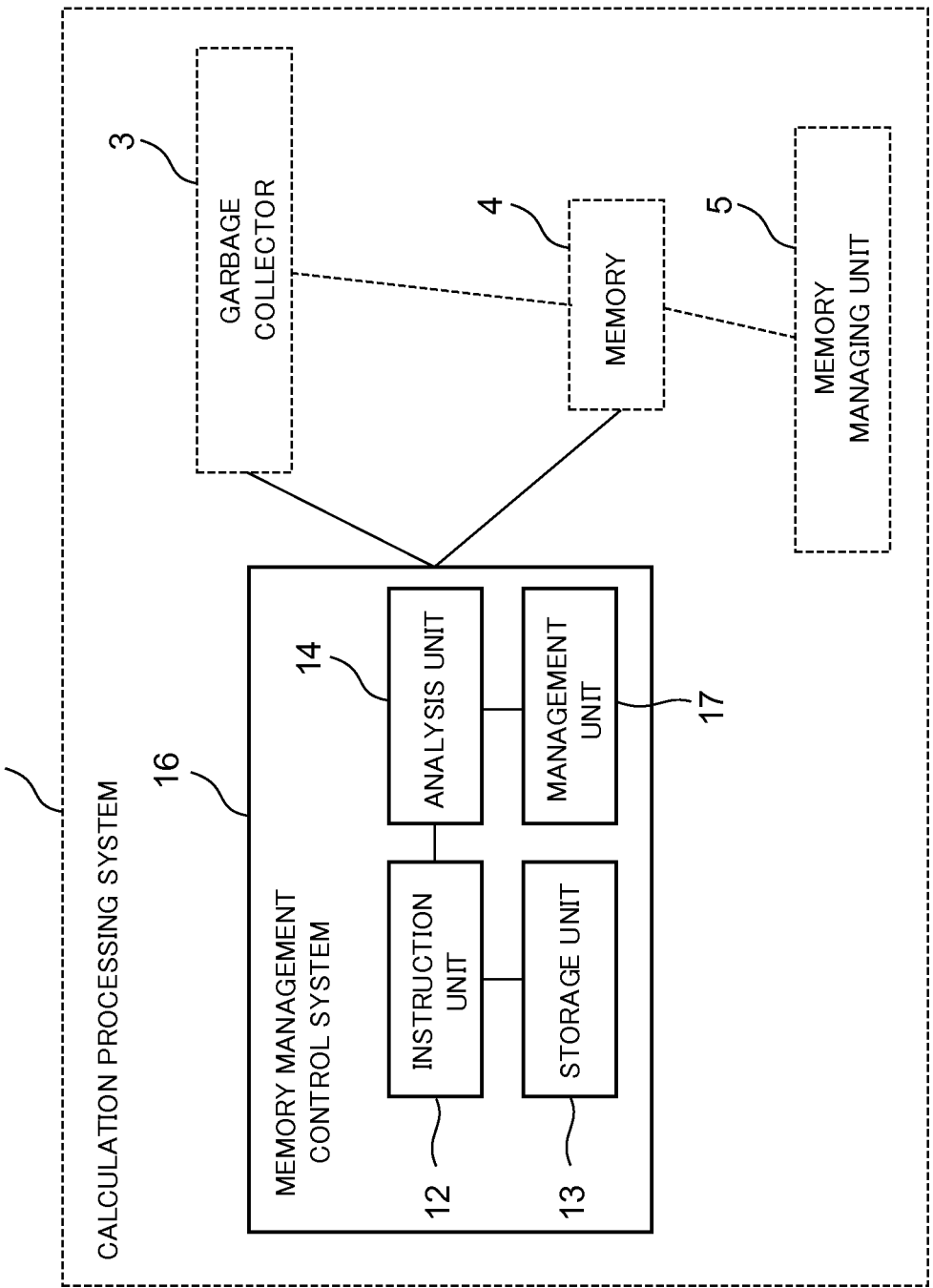
FIG. 11 is a block diagram showing a configuration of a memory management control system according to a fourth exemplary embodiment of the present invention.
Figure 12:
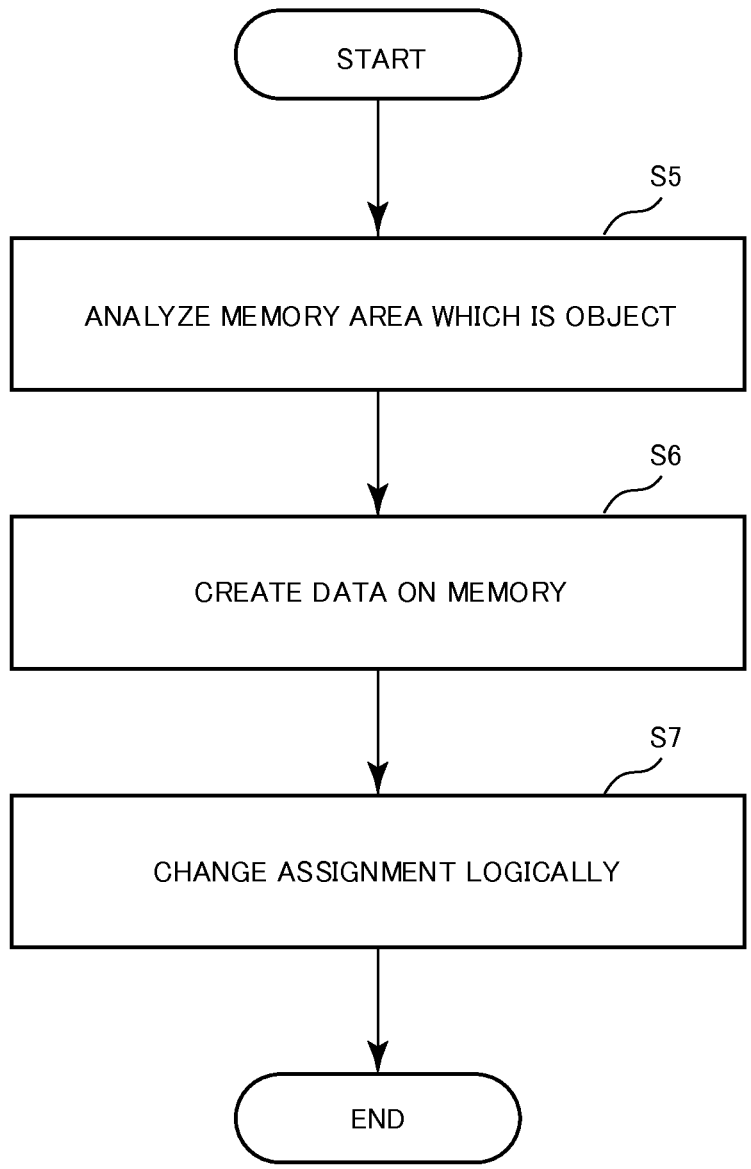
FIG. 12 is a flowchart showing a flow of processes in the memory management control system according to the fourth exemplary embodiment.

A configuration which a memory management control system 16 according to the fourth exemplary embodiment has, and a process that the memory management control system 16 executes will be described in the following with reference to FIG. 11 and FIG. 12. FIG. 11 is a block diagram showing the configuration of the memory management control system 16 according to the fourth exemplary embodiment of the present invention. FIG. 12 is a flowchart showing a flow of the processes in the memory management control system 16 according to the fourth exemplary embodiment.

Referring to FIG. 11, the memory management control system 16 further includes a management unit 17 that manages a memory area collected in GC by changing assignment of the memory area (partial memory area in the memory 4) logically. A calculation processing system 18 includes the memory management control system 16, the garbage collector 3, the memory 4 and the memory managing unit 5.

By referring to the memory area collected in GC, the management unit 17 analyzes the memory area (Step S5). Next, the management unit 17 creates data that indicates an analysis result (Step S6). As an example of the data indicating the analysis result, it is possible to exemplify byte arrangement. Next, by changing the logical assignment that is executed for the memory area collected in GC, the management unit 17 manages the memory area (Step S7).

Figure 13:
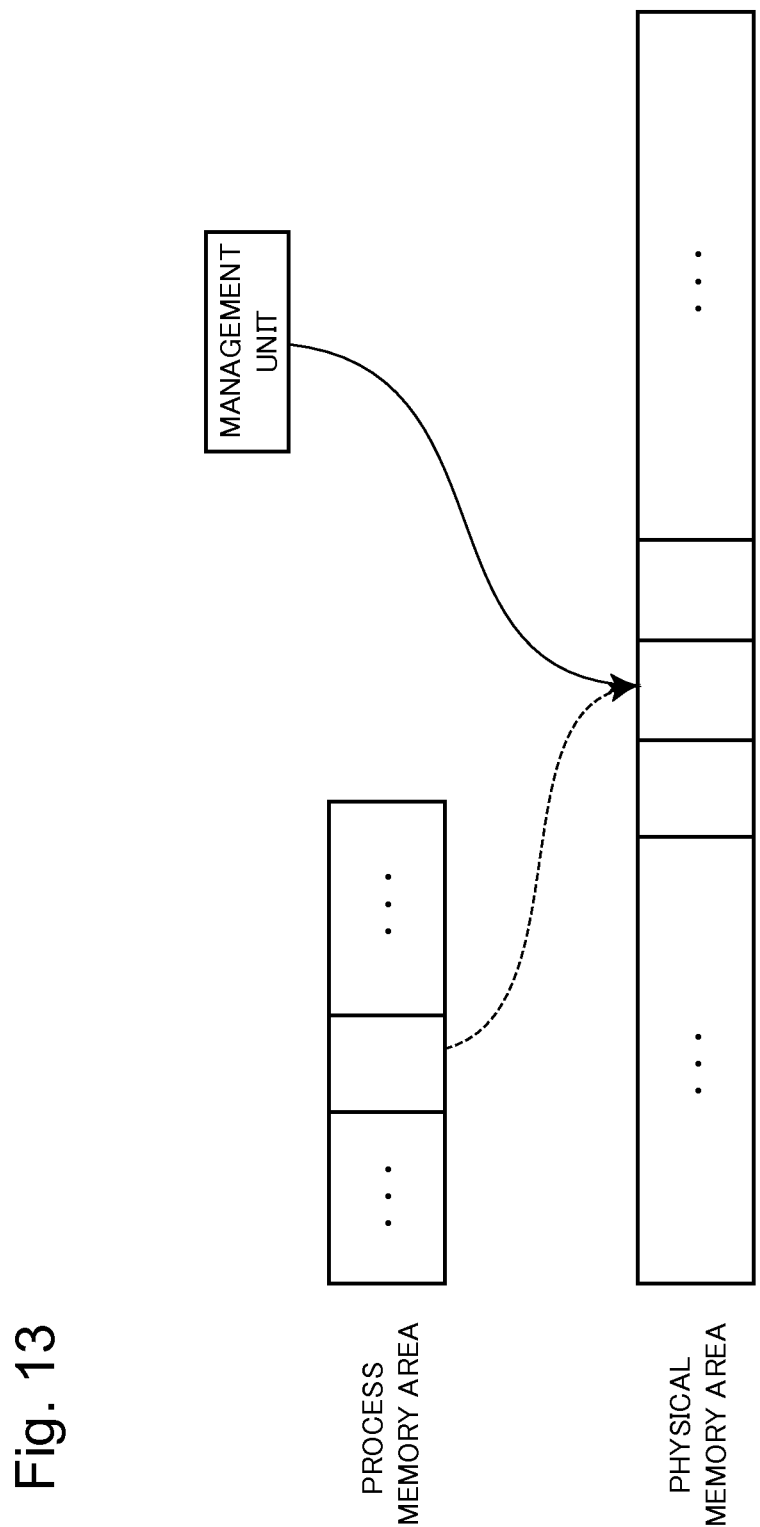
FIG. 13 is a conceptual diagram showing processes in a management unit according to the fourth exemplary embodiment.

A process of Step S7 will be described in the following with reference to FIG. 13. FIG. 13 is a conceptual diagram showing a process executed by the management unit 17 according to the fourth exemplary embodiment. An arrow shown in FIG. 13 indicates reference relation in a memory space. Referring to FIG. 13, for example, GC collects a physical memory area (dotted line arrow in FIG. 13) to which a certain process refers. The physical memory area may be realized by a data store that exists in the distributed processing environment (hereinafter, referred to as "physical memory area" which includes the data store). The management unit 17 manages the physical memory area by changing the logical assignment which is executed for the physical memory area (solid line arrow in FIG. 13)

Even if the management unit 17 manages the physical memory area by GC as mentioned above, data in the physical memory area does not change. Since the management unit 17 according to the fourth exemplary embodiment does not utilize data communication, it is possible to refer to the data that exists in the memory unit of the GC object with very low cost.

Since the configuration according to the fourth exemplary embodiment is the same as one according to the third exemplary embodiment, the fourth exemplary embodiment can have the same effect as the third exemplary embodiment has.

That is, according to the memory management control system of the fourth exemplary embodiment, it is possible to decrease degradation of processing performance.

(Example of Hardware Configuration)

An example of a configuration of hardware resources, which realize the memory management control system according to each exemplary embodiment of the present invention mentioned above by using one calculation processing apparatus (information processing apparatus or computer), will be described in the following. Here, the memory management control system may be realized by using at least two calculation processing apparatuses physically or functionally. Moreover, the memory management control system may be realized as a dedicated apparatus.

Figure 14:
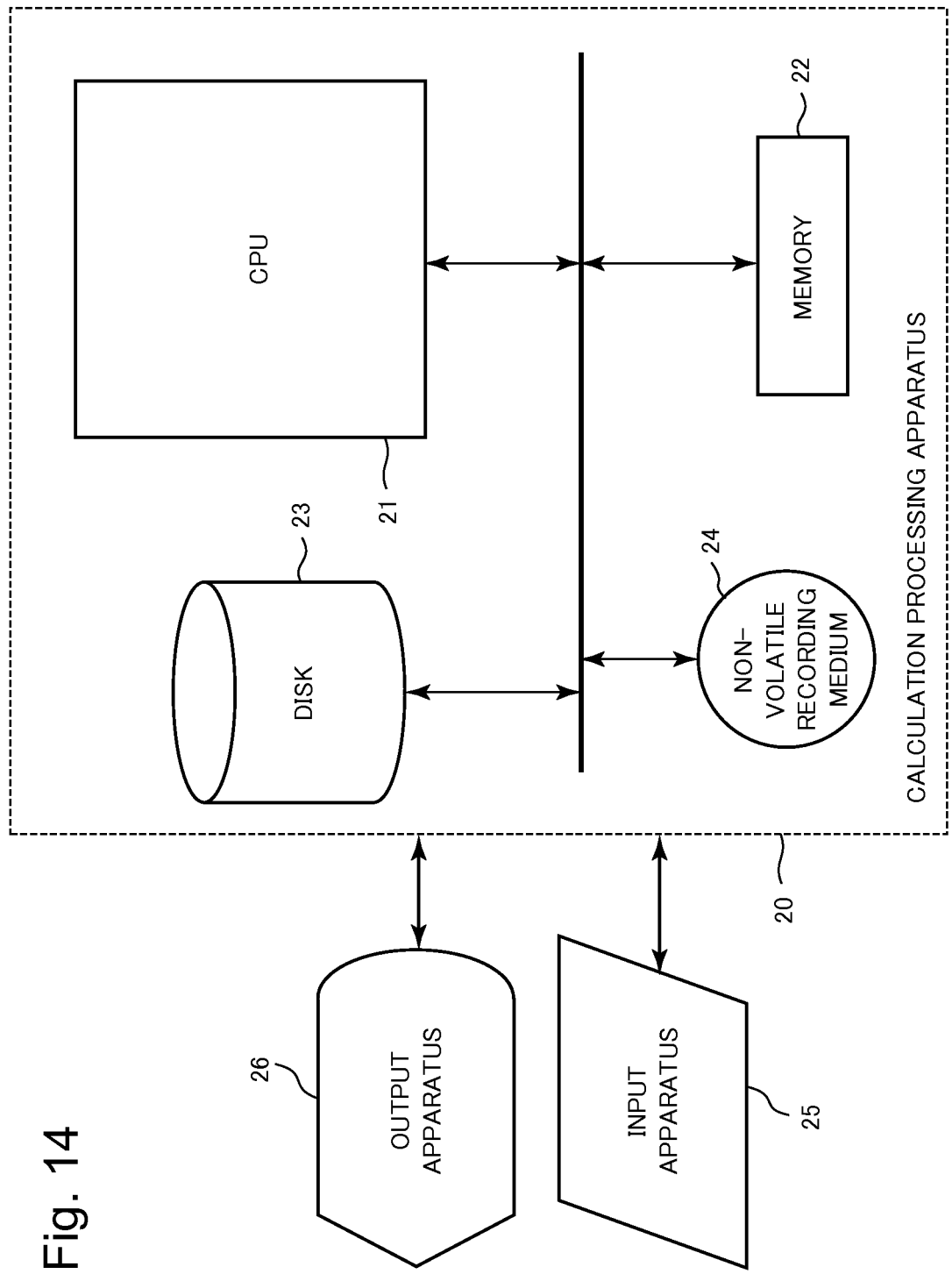
FIG. 14 is a schematic block diagram showing a hardware configuration of a calculation processing apparatus which can realize the memory management control system according to each exemplary embodiment of the present invention.
Figure 15:
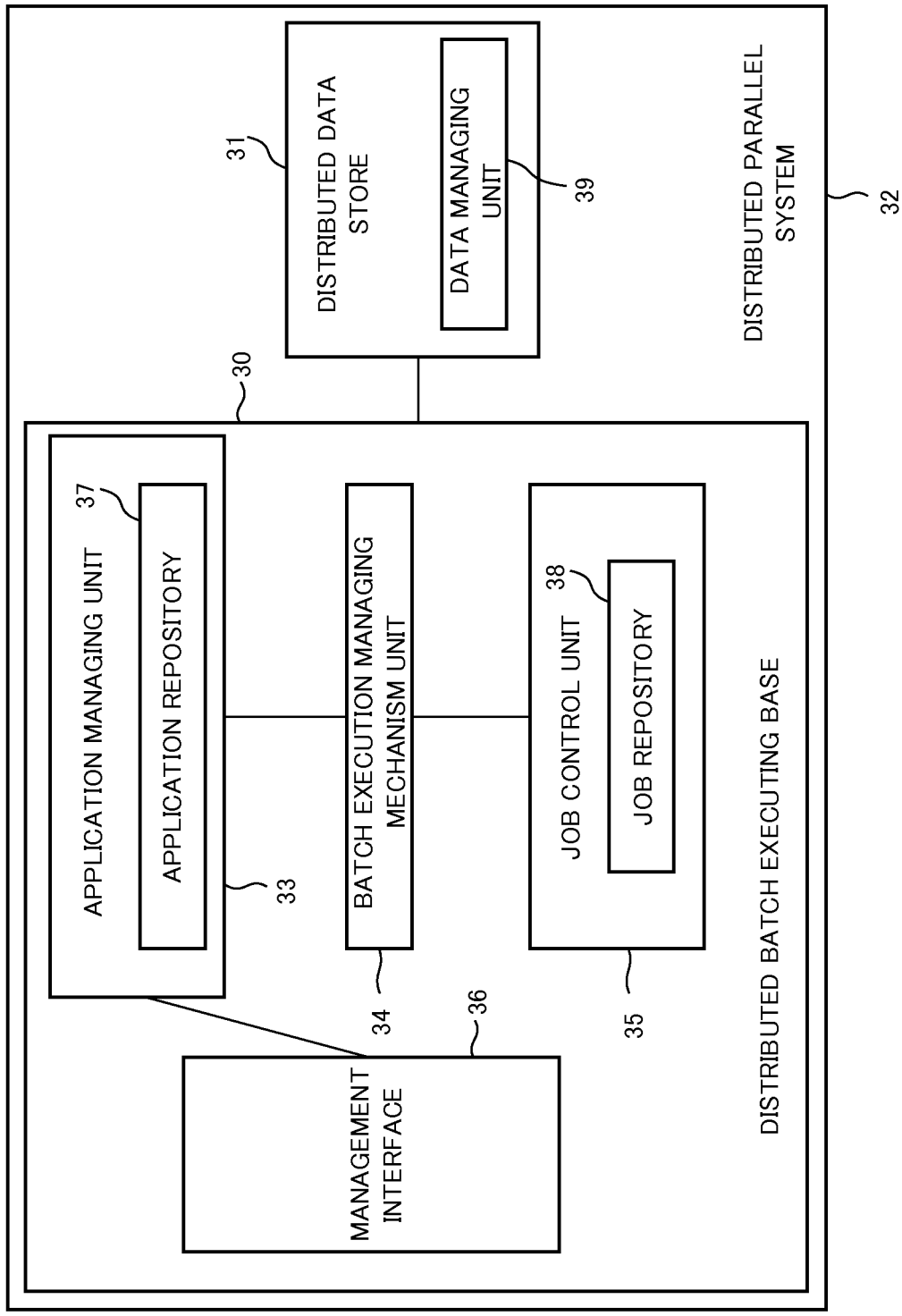
FIG. 15 is a block diagram showing a system configuration of a distributed batch executing base related to the present invention.

FIG. 14 is a schematic diagram showing a hardware configuration of a calculation processing apparatus which can realize the memory management control system according to the first exemplary embodiment to the fourth exemplary embodiment. A calculation processing apparatus 20 includes Central Processing Unit (hereinafter, referred to as "CPU") 21, a memory 22, a disk 23, a non-volatile recording medium 24, an input apparatus 25 and an output apparatus 26.

The non-volatile recording medium 24, which is computer-readable medium such as Compact Disc, Digital Versatile Disc, Blu-ray Disc, USB (Universal Serial Bus) memory and Solid State Drive or the like, stores the program even when an electric power is not supplied, and the non-volatile recording medium 24 is portable. The non-volatile recording medium 24 is not limited to the medium mentioned above. Moreover, instead of using the non-volatile recording medium 24, the program may be carried through a communication network.

That is, when CPU 21 executes a software program (computer program: hereinafter, abbreviated as "program") which the disk 23 stores, CPU 21 copies the program in the memory 22 and executes a calculation process. CPU 21 reads data that is necessary to execute the program from the memory 22. In the case that displaying is needed, CPU 21 makes the output apparatus 26 display an output result. In the case that the program is inputted from an outside, CPU 21 reads the program from the input apparatus 25. CPU 21 interprets and executes a memory management control program (FIG. 2, FIG. 6, FIG. 10 and FIG. 12) that exists in the memory 22 and that corresponds to the function (process) of each unit that is shown in FIG. 1, FIG. 5, FIG. 9 or FIG. 11 mentioned above.

CPU 21 executes the processes that have been described in each exemplary embodiment of the present invention mentioned above in sequence.

That is, in this case, it is conceivable that the present invention can be achieved by the memory management control program. Moreover, it is also conceivable that the present invention can be achieved by a computer-readable nonvolatile recording medium that records the memory management control program.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A memory management control system comprising:
   a memory having a first memory area, a second memory area, and a third memory area;
   a calculation processing system to execute a processing job in relation to the second memory area, the processing job having been executed or scheduled to be executed;
   a garbage collector of the calculation processing system that has determined to purge data in the first memory area;
   an instruction unit to:
   write the data stored in the first memory area, to the third memory area if the data stored in the first memory area is identical to data stored in the second memory area; and
   not write the data stored in the first memory to the third memory area are if the data stored in the first memory area is not identical to the data stored in the second memory area.

2. The memory management control system according to claim 1, wherein, the instruction unit decides to write or not to write based on a job schedule associating the scheduled job and the second memory area.

3. The memory management control system according to claim 1, further comprising:
   an analysis unit that extracts a Java object from the first memory area, decided whether the Java object is metadata or not, and specifies an object of the metadata as the data to write into the memory if the Java object is metadata.

4. The memory management control system according to claim 3, further comprising:
   a management unit to manage the first memory area, wherein
   the analysis unit specifies the object by referring to the first memory area that the management unit manages.

5. A memory management control method comprising:
   executing or scheduling execution of a processing job in relation to a second memory area of a memory also having a first memory area and a third memory area;
   determining to purge data in the first memory area;
   writing the data stored in the first memory area into the third memory area if the data stored in the first memory area is identical to data stored in the second memory area; and
   not write writing the data stored in the first memory to the third memory area are if the data stored in the first memory area is not identical to the data stored in the second memory.

6. A non-transitory computer readable storage medium storing a memory management control program which makes a computer realize:
   a function that executes or schedules execution of a processing job in relation to a second memory area of a memory also having a first memory area and a third memory area;
   a function that determines to purge data in the first memory area;
   a function that writes the data stored in the first memory area into the third memory area if the data stored in the first memory area is identical to data stored in the second memory area; and
   a function that does not write the data stored in the first memory to the third memory area are if the data stored in the first memory area is not identical to the data stored in the second memory.

7. The storage medium storing the memory management control program according to claim 6, wherein
   the instruction function decides to write or not to write based on a job schedule associating the scheduled job and the second memory area.

8. The storage medium storing the memory management control program according to claim 6, wherein
   an analysis function that extracts a Java object from the first memory area, decided whether the Java object is metadata or not, and specifies an object of the metadata as the data to write into the memory if the Java object is metadata.

* * * * *